United States Patent

Swinney

[15] 3,656,476

[45] Apr. 18, 1972

[54] POLYMERIC STRUCTURES

[72] Inventor: Frederick Bernard Swinney, Wyoming, Mich.

[73] Assignee: Polymer Corporation, Sarnia, Ontario, Canada

[22] Filed: Feb. 3, 1970

[21] Appl. No.: 12,481

Related U.S. Application Data

[63] Continuation of Ser. No. 581,179, Sept. 22, 1966, abandoned.

[30] Foreign Application Priority Data

Feb. 16, 1966  Canada...................................952364

[52] U.S. Cl. .............................................................128/90
[51] Int. Cl. ...........................................................A61f 05/04
[58] Field of Search ......................128/89, 90; 260/82.1, 894

[56] References Cited

UNITED STATES PATENTS

| 2,853,067 | 9/1958 | Puharich | 128/90 |
| 3,347,839 | 10/1967 | Lasis | 260/82.1 |
| 3,326,824 | 6/1967 | Graham | 260/894 |
| 2,194,579 | 3/1940 | Wedger | 128/90 UX |
| 2,496,976 | 2/1950 | Barney | 260/82.1 |
| 3,286,693 | 11/1966 | Clarke et al. | 128/90 X |

FOREIGN PATENTS OR APPLICATIONS

4,751  1893  Great Britain ....................128/90 UX

OTHER PUBLICATIONS

Pearson " Crude Rubber and Compounding Ingredients," India Rubber Publishing Co. N.Y. pg. 398, 1918

*Primary Examiner*—Samuel Koren
*Assistant Examiner*—G. M. Yahwak
*Attorney*—Stevens, Davis, Miller & Mosher

[57] ABSTRACT

Orthopedic structures are prepared by forming an envelope of a defined material in a flexible form around a body member, heat-softening and uniting the adjoining portions of the envelope, and allowing the envelope to harden at reduced temperature. The defined material is a composition based on a crystalline high molecular weight polymer of a conjugated diolefinic compound; preferably the crystalline polymer is trans-1,4 polyisoprene.

8 Claims, No Drawings

POLYMERIC STRUCTURES

This application is a continuing application of my copending U.S. application Ser. No. 581,179, filed Sept. 22, 1966, now abandoned.

This invention relates to hard, rigid orthopaedic structures comprised of crystalline polymers of conjugated diolefinic compounds.

The term "orthopaedic structures" as used herein refers to casts, splints, and the like, for body members; it also includes corsets, braces, artificial limbs, arch supports, and protective pads for body members.

In order to secure and support an injured or diseased limb, use is made of a cast, said cast being made very frequently from plaster of paris, water and cloth bandages. Casts are ordinarily applied to the patient by immersing in water a roll of starch-stiffened bandage material impregnated with plaster of paris, squeezing out the excess water, and then rolling in a spiral manner the bandage on the arm, leg, joint or other portion of the body to be immobilized, overlapping the various layers until a cast of the desired thickness has been built up.

Resins, such as the melamine formaldehyde resins, and binders, such as polyvinyl acetate or gum arabic, are commonly used in admixture with plaster of paris to give casts with improved properties. Polystyrene, and blends of fiber glass with a resin, such as cellulose acetate, have been used as replacements for plaster of Paris; such materials are immersed in a solvent, such as acetone, which evaporates off after application of the composition, leaving a hard, rigid cast.

Several disadvantages are associated with the preparation of plaster of paris casts. The process itself is messy, a considerable proportion of the plaster of paris being lost, during the formation of the cast. Another problem is the length of time it takes to apply such casts; by prolonging the surgical time, and in many cases the time of anesthesia, the surgical danger is increased. The wetted bandages subject the body member to moisture which tends to irritate the skin. As the plaster dehydrates, considerable heat is generated, resulting in discomfort for the patient.

The plaster of paris casts are unattractive in appearance and heavy. Such casts tend to break or crack and cannot be re-used after their removal, in the event of excessive swelling of a body member, or for X-ray exposure, or for physiotherapy, etc. Foreign materials present in the cast such as starch and glue, are irritating to patients suffering from allergies and act as a culture medium for the growth of bacteria and harmful moulds. The melamine formaldehyde resins, used to strengthen plaster of Paris, have caused skin irritations to patients, nurses and doctors.

The fire and toxicity hazards associated with the use of solvents has discouraged the substitution of prior art synthetic materials for plaster of paris in orthopaedic structures.

It is the object of the present invention to provide novel sheet materials for producing orthopaedic structures having improved properties. Another object is to provide a method of producing orthopedic structures from these novel sheet materials.

This invention affords a replacement for bandages based on plaster of Paris and provides for the formation of orthopaedic structures that:

1. may be readily formed or reformed;
2. are durable and light in weight; and
3. have excellent X-ray transmitting properties.

The objects of the invention are accomplished by providing a thermoplastic sheet material for producing an orthopaedic structure which comprises a composition based on a crystalline high molecular weight polymer of a conjugated diolefinic compound containing 4–8 carbon atoms said composition being capable of softening to a plastic state by heating at a temperature of not less than about the melting point of said polymer and retaining said state for a period between 1 minute and about 2 hours at ambient temperature of 20°–30° C.

The objects of the invention are also accomplished by a method of producing an orthopaedic structure from a thermoplastic sheet material of a composition based on a crystalline high molecular weight polymer of a conjugated diolefinic compound containing 4 to 8 carbon atoms, which comprises (1) enveloping a body member with the sheet material, said material being flexible, (2) heating the adjoining sides of the envelope at a temperature of not less than about the melting point of said polymer, (3) uniting said adjoining sides to form a bond, and (4) exposing the bonded envelope to a temperature below the melting point of said polymer for a period between 1 minute and about 2 hours, whereby the envelope hardens to form said orthopedic structure.

The polymers which can be used in the production of orthopaedic structures of this invention are crystalline polymers of open chain conjugated diolefinic compounds containing 4 – 8 carbon atoms and at least one vinyl group. The diolefinic compounds may be represented by the general formula:

$$H_2C = CR - CR^2 = CHR^3$$

where R, $R^2$ and $R^3$ are hydrogen or an alkyl radical containing 1 to 4 carbon atoms. It is preferred to use a polymer of a diolefin containing 4 to 6 carbon atoms such as butadiene-1,3, isoprene, piperylene, 2,3-dimethyl butadiene-1,3 and 2-ethyl butadiene-1,3. Copolymers of these diolefins with each other or with minor amounts of $C_2 - C_8$ monoolefins may also be used, although for best results homopolymers are preferred. The polymer is crystalline at room temperature and produces a characteristic X-ray diffraction pattern with distinct spots, typical of well ordered structures such as found in salt crystals. The polymers of conjugated diolefins should be at least 5 percent and preferably at least 10 percent crystalline as determined by X-ray methods at a temperature of 20°– 30° C. The upper limit of crystallinity is not critical, although it is not practical to use polymers higher than 60 percent crystalline. For best results, a crystallinity of about 20 to 40 percent is preferred. The optimum crystallinity level varies somewhat depending on the type of crystals and their melting point. In general, polymers of conjugated diolefins should have at least 85 percent of the monomeric units in a trans-1,4 configuration. Trans-1,4 polyisoprene, trans-1,4 polybutadiene and trans-1,4 polypiperylene are representative examples of such polymers and best results are obtained with trans-1,4 polyisoprene. The melting points of the crystalline polymers which are used in the orthopaedic structures of this invention may vary within wide limits, although it is preferred to use polymers having a melting point below 100° C., and preferably in the range between about 50° C. and about 80° C.

Characteristic feature of these crystalline polymers is that they are tough, rigid and hard at usual atmospheric temperatures or at the body temperature and soften to a rubbery plastic state at temperatures at which polymeric crystals melt. The transition from the hard to the soft state occurs at temperatures of up to 10° C. below the actual melting point, as determined by an X-ray technique. Trans-1,4 polyisoprene, for example, has a softening temperature of about 55° C. and a melting point of 64° C. The polymer is satisfactorily workable at the softening temperature and may be shaped although it is preferred to work at the melting temperature or above for easier handling and improved tack.

The molecular weight of the polymer which can be used according to the invention is in a range between about 50,000 and 350,000. Polymers of lower molecular weight can be also used, although the compositions containing them are extremely sticky at the softening temperature and present problems in the production of thermoplastic sheet materials and their use in orthopedic structures. Similarly, polymers having a molecular weight above 350,000 are of reduced utility because they are difficult to process into sheet materials and to shape and bond them to form orthopedic casts. The preferred range of the molecular weight of the preferred trans-1,4 polymers is between about 85,000 and about 200,000. The molecular weight referred to herein is a viscosity average molecular weight which is calculated from the intrinsic viscosity according to the general equation:

$$[\eta] = KM^a$$

where $$[\eta]$$

is the intrinsic viscosity, $M$ is the viscosity average molecular weight, and $K$ and $a$ are constants experimentally determined for a given polymer-solvent system. For example, the constants in toluene are $4.37 \times 10^{-4}$ and 0.65 respectively for trans-polyisoprene at 30° C. The molecular weight of rubbery polymers is also expressed in terms of the Mooney viscosity which is measured according to ASTM procedure D-1646-61. The Mooney viscosity (ML − 1 + 4 at 100° C.) of trans-1,4 polyisoprene, the preferred polymer of this invention, ranges from about 5 to about 50 and preferably from 15 to 30.

The synthetic crystalline trans-1,4 polymers are prepared by polymerizing a conjugated diolefin in a hydrocarbon or halohydrocarbon diluent in the presence of stereospecific catalysts such as a mixture of $AlR_3$ and $VCl_3$ or $LiAlH_4$ and $TiI_4$ where R is preferably an alkyl radical. These catalysts, generally called the Ziegler type catalysts, are well known in the art. The product of the polymerization may be used in the form of a cement or in solid form after recovery and purification.

Naturally occurring trans-1,4 polyisoprene, known to the art as balata and gutta percha, may be used in the orthopaedic structures of this invention but the purer synthetic grade of this polymer is preferred.

The crystalline trans-1,4 polymer of conjugated diolefins can also be used in blends with other polymeric materials for preparing the orthopaedic structures of this invention. For example, 100 parts by weight of trans-1,4 polyisoprene can be blended with up to 50 parts by weight of a styrene-butadiene copolymer or acrylonitrile-butadiene copolymer without adversely affecting the useful properties of the trans-1,4 polymer. For best retention of hardness and rigidity in the blends with the trans-1,4 polydienes, copolymers or mixtures of copolymers containing about 40 to 70 percent by weight of styrene and/or acrylonitrile are preferably used. Similarly, up to 100 parts by weight of polyethylene may be blended with 100 parts by weight of trans-1,4 polymer.

Where fillers are included as an ingredient of the polymeric composition in thermoplastic sheet materials, they may be added to the trans polydiolefin on a two roll mill or in a Banbury internal mixer. Up to 150 parts by weight of fibrous or powdery fillers such as silica, calcium carbonate, aluminum silicate, zinc oxide, may be used with 100 parts by weight of trans-1,4 polymer to impart greater strength to the structures and ease of processability during the fabrication of sheet materials; for best results, however, fillers are used in amounts of 5 to about 50 parts by weight per 100 parts by weight of the trans-1,4 polydiolefin. Carbon blacks may also be used in similar amounts if a non-white structure is desired. A compatible, preferably non-allergenic tackifying resin such as the polyterpenes, coumarone-indene resins, epoxy resins, natural wood resins may be added if desired to improve processability and bonding of the polymeric composition to itself during application to the body. The optimum amount of the resin depends on the type of trans-1,4 polymer used and on the particular method of producing orthopaedic structures and may vary from 0 to 30 parts by weight per 100 parts of the trans-1,4 polymer. Up to 10 parts by weight of a coloring agent such as titanium dioxide (white) or an organic dye may also be used with 100 parts by weight of the trans-1,4 polydiolefin where a particular colour is desired. Fillers, resins and colouring agents are preferably selected from those compounds which transmit X-rays.

The above components which are added to the crystalline high molecular weight trans-1,4 polymer to form the above compositions produce significant changes in the speed with which the composition hardens at ambient temperatures of 20°–30° C. It is therefore possible to vary the time period in which the heat softened composition remains in the soft plastic deformable state within a wide range from about 1 minute to several hours. The rate of hardening of the crystalline polymer can be increased or decreased depending upon the loading and selection of the additional polymer, filler, resin, coloring agent, etc. used. It is preferred to control that period to between 5 minutes and about 2 hours as required in the production of orthopaedic structures.

Prior to their use in orthopaedic structures, the thermoplastic sheet materials of the present invention can be prepared by several methods. One such method is to calender the polymer composition at a temperature of 60°–100° C. to form a sheet material having a thickness of about 0.01–6.0 millimeters. The material can be cut to rectangles of dimensions as desired, e.g. less than 1.0 meter wide and up to 6 meters long. The sheet material used in making bandages is preferably cut to strips about 5 to 20 centimeters wide and 3–6 meters long. The thickness of the bandage sheet material preferably is about 0.5 to 2.0 millimeters so that it can be rolled to a customary and convenient form of bandage roll. If stiff at a certain thickness, the sheet material may be softened by heating and rolled to a tight roll. A release liner such as polyethylene or a silicone treated parchment may be used to prevent self-adhesion of the rolled sheet material.

Sheet materials of the composition as described above may also be produced by extruding in the form of a tubing. In this tubular form it can be used for the production of orthopaedic structures such as artificial limbs. Alternatively, the tubing may be split open to produce a flat sheet material.

Another method which may be used to calendar the polymer composition onto the surface of an open weave fabric, which may be pretreated with a tackifying resin to increase the adherence of the polymer to the fabric; the fabric increases the strength of the bandage in the soft plastic stage. Other methods of coating the fabric surface with the polymer composition include passing the fabric through or under a solution or an emulsion of the polymer composition. The polymer composition may also be added as a powder to the fabric, subsequent heating at temperatures greater than about 50° C. will cause the polymer to adhere to the fabric. Another method involves the use of fibers made of the polymeric composition based on the crystalline polymers as hereinbefore described. Such fibers may be produced by conventional techniques of extruding polymer melts or solutions and subsequent drawing of the filaments. They may be woven into a gauze or heavier fabric or alternatively they may be felted to form a non-woven fabric sheet about 1 – 6 mm. thick. These fabric sheets can be then cut to strips of a desired width and rolled as bandage packages.

The sheet materials or bandages prepared by the above described methods may be applied to a body member in the usual manner. The rigid sheet materials are softened to a plastic pliable state and then applied around the body member to form an envelope. The bandages may be wound spirally with a substantial degree of overlapping about the body member until a sufficient thickness is built up as required for strength and rigidity in an orthopaedic structure. The preferred method of reducing the sheet material or bandage to the plastic pliable condition is to heat the composition above its softening point, for example, by immersing in hot water or by exposure to hot air. The heated bandage remains pliable for a period ranging between 5 minutes and about 2 hours at temperatures below the softening point, e.g. at ambient temperatures of 20°–30° C., and thus can be applied to the patient's body member without causing discomfort. For example, the sheet made essentially of trans-1,4 polyisoprene would be soft for about 10 – 60 minutes at room temperature so that sufficient time is available for the orthopaedist to apply, shape and bond the envelope to form a cast. Bonding may be conveniently achieved by heating the adjoining and overlapping sides of the thermoplastic sheet material or bandages to a temperature at which the composition is pliable and tacky; localized pressure is then applied to establish an adhesive contact between the adjoining sides and overlapping areas, respectively, the action of heat at least partially fusing the contacted material. The envelope so formed is then exposed to am ambient temperature of about 20° – 30° C whereby the envelope hardens to a rigid orthopaedic structure. The time required for hardening depends, as mentioned hereinbefore, on the type of the composition as well as on the ambient temperature. If it is desired to speed the hardening process, the cast may be cooled by immersing in cold water or by exposure to cold air.

The following examples will further illustrate the invention. In these examples, all parts are parts by weight unless otherwise specified.

EXAMPLE 1

5 parts of titanium dioxide and 15 parts of a precipitated hydrated silica having an average particle size of about 0.02 microns were thoroughly blended into 100 parts of a synthetic trans-1,4 poly-isoprene on a two-roll mill at a temperature of 80° C. The composition was sheeted out to a thickness of 2.5 millimeters and allowed to cool to room temperature. A sheet about 25 centimeters square was cut from the sheeted material and warmed in an oven at a temperature of about 50° C. It became soft, moldable and tacky. This sheet was then wrapped on an arm between the elbow and the knuckles to form an envelope and the adjoining sides of this envelope were united by pressing them together, along a joint. The excess material beyond the joint was removed by scissors and the seam was then smoothed by a warm steel blade. The envelope set into a hard uniform cast, which immobilized the body member, after about 20 minutes at a temperature of 25° C. The surface of the cast was smooth and had a pleasant texture. The appearance of the cast which had an off-white colour was very satisfactory. It was found to be transparent to X-rays.

A similar procedure was used to produce a cast about an elbow. The sheet was pre-cut so that it was wrapped around the elbow without overlapping. The adjoining sides of the pre-cut sheet were united to form seams which were then smoothed over by a blade and finger. The setting time of the cast was reduced to about 5 minutes by immersing same in water at a temperature of 5° C.

EXAMPLE 2

A polymeric composition was prepared by blending on a 2-roll mill, 5 parts of titanium dioxide and 100 parts of trans-1,4 polyiso-prene having a Mooney viscosity (ML − 1 + 4 at 100° C.) of 25 and crystallinity of 28 percent as determined by X-ray. The composition was sheeted to a thickness of about 2.5 millimeters. A small sheet was cut therefrom and wrapped about the index finger to form a finger stall. The adjoining sides of the wrap were united by pressing them together and fusing to form a barely detectable seam. The overlapping parts of the stall were removed by scissors. A satisfactory rigid orthopaedic structure of pleasing texture and appearance was produced on cooling at room temperature.

EXAMPLE 3

Finger stalls which had satisfactory properties were also prepared from the following compositions, according to the procedure of Example 2.

| | | |
|---|---|---|
| Trans-1,4 polyisoprene | 100 | 50 |
| Trans-1,4 polychloroprene (a) | – | 50 |
| Precipitated hydrated silica | – | 15 |
| Titanium dioxide | – | 5 |
| Polystyrene resin (b) | 20 | – |

Polymer (a) is trans-1,4 polychloroprene having a Mooney viscosity (ML − 1 + 4 at 100° C.) of 20 and a crystallinity of about 25 percent.

Resin (b) is a low molecular weight polymer prepared from a mixture of styrene and substituted styrenes.

The preceding examples show that the thermoplastic sheet materials of this invention can be used for producing casts, splints and other orthopaedic structures for body members.

Orthopaedic structures comprised of trans-1,4 polydiolefin compounds can also be utilized as corsets, braces, artificial limbs, arch supports. Rigid articles comprised of trans polydiolefins are also useful as protective guards used for sporting activities; examples of such articles are head guards, shin pads, rib and kidney protectors, shoulder pads as used in hockey and football.

What is claimed is:

1. A method of producing an orthopedic structure which comprises:
    1. enveloping a body member with a thermoplastic sheet material comprising a mixture of a synthetic polymer of isoprene and 5 to about 50 parts by weight per 100 parts polymer of a filler, said polymer having at least 85 percent of the isoprene monomer units in the trans-1,4 configuration, a Mooney viscosity (ML−1+4 ' at 100°C) of from 5 to 50 and being about 20–40 percent crystalline, as determined by X-ray diffraction at a temperature from 20° to 30° C., said sheet material having a thickness of not more than about 6 millimeters and being in a plastic workable state at a temperature of not over 64° C., whereby a flexible envelope is produced around said member,
    2. shaping said flexible envelope onto said member whereby the inner form of the envelope corresponds to the form of said body member,
    3. heating the adjoining sides of said envelope at a temperature between about 50° and about 80° C. to make them tacky,
    4. uniting said sides to form a bonded envelope and
    5. exposing the bonded envelope to an ambient temperature of not more than 30° C. for a period between 1 minute and about 2 hours whereby the envelope hardens to form said orthopedic structure.

2. The method according to claim 1 wherein the thermoplastic sheet material has a thickness of about 0.5 to 2.0 millimeter.

3. The method according to claim 2 wherein the body member is enveloped by more than one layer of said sheet material forming multiple overlapping portions and said overlapping portions are united to form said bonded envelope.

4. The method according to claim 1 wherein the bonded envelope in said step (5) is immersed in water at a temperature of 0° to 15° C.

5. A rigid orthopaedic or prosthetic structure made of a thermoplastic sheet material having a thickness of not more than about 6 millimeters and comprising a mixture of a synthetic polymer of isoprene having at least 85 percent of the isoprene monomer units in the trans-1,4 configuration, and 5 to about 50 parts by weight per 100 parts polymer of a filler, said polymer being about 20–40 percent crystalline as determined by X-ray diffraction at a temperature from 20° to 30° C. and having a Mooney viscosity (ML−1+4' at 100° C.) of from 5 to 50, said structure being formable and reformable at a temperature of not over 64° C. to the shape of body member to be protected or fitted on with said structure.

6. The structure of claim 6 in which the sheet material is in the form of a tubing.

7. The structure of claim 5 in which the sheet material is in the form of a bonded envelope.

8. The structure of claim 5 in which the sheet material essentially consists of 100 parts by weight of said polymer of isoprene, about 10 parts by weight of hydrated silica and about 5 parts by weight of titanium dioxide.

* * * * *